Dec. 4, 1934.  H. MASSÉ  1,982,682
MOTOR MOUNTING
Filed July 27, 1933
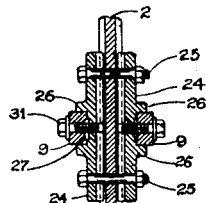
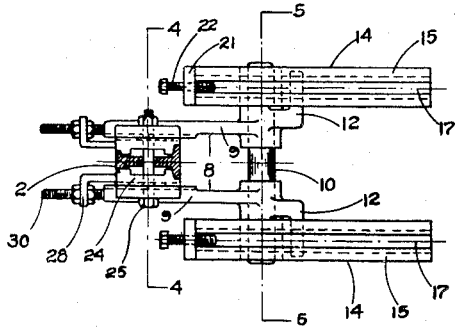
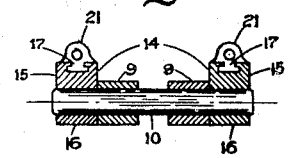
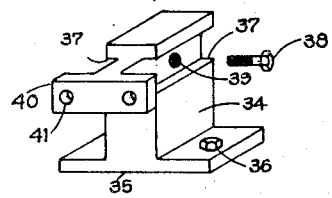
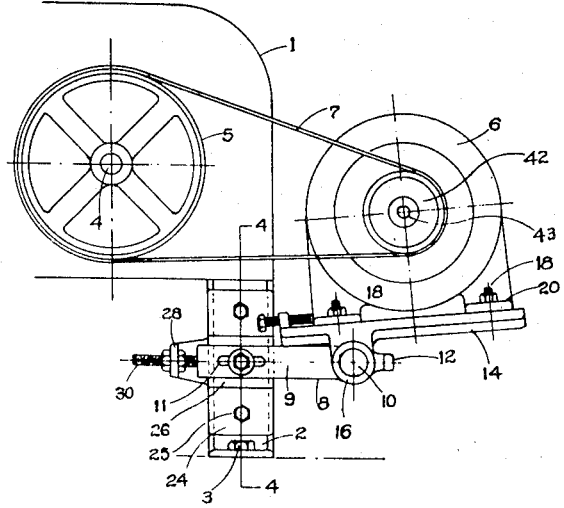
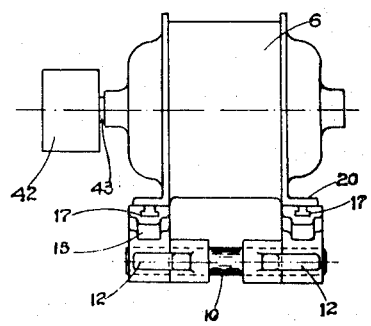
INVENTOR
Horsmidas Massé
BY Seeley H. Plant
ATTORNEY Patented Dec. 4, 1934

1,982,682

UNITED STATES PATENT OFFICE 1,982,682

MOTOR MOUNTING

Hormisdas Massé, Woonsocket, R. I.

Application July 27, 1933, Serial No. 682,414

8 Claims. (Cl. 308—11)

This invention relates to an improved motor mounting and more particularly to a device of this character which is capable of or adapted for adjusted attachment to an upright or a portion of a machine frame for supporting a motor in operative relation with a pulley to be driven.

One object of the invention is the provision of a mounting of this character provided with a base portion adapted for adjusted attachment to an upright member in such a manner as to permit the positioning of the motor in the desired relation with a pulley to be driven by means of a bodily adjustment of the base portion with relation to an upright or a part of a machine frame.

Another object of the invention is the provision of a balanced mounting for a motor wherein the parts are so constructed and arranged as to permit a proper adjustment of the motor for effecting the desired degree of tension on a drive belt.

A further object of the invention is the provision in a motor mounting of means for adjustably locating the motor mounting as a whole with reference to a pulley to be driven, together with means for adjustably positioning the motor on a support to obtain what may be termed a double adjustment of the motor with reference to the pulley, whereby the motor may be located in adjusted relation with the pulley and may also be so positioned upon its support as to impart a definite and substantially uniform tension to the drive belt, which tension may be varied as conditions require or the circumstances of the particular case render expedient.

Another object of the invention is the provision in a device of this character of means for utilizing the weight of the motor itself for applying a substantially constant and uniform tension to a drive belt, as well as means for varying the motor weight tension by adjusting the position of the motor with relation to the pivot shaft or the position of the mounting as a whole with relation to the pulley to be driven, or by reinforcing the motor weight tension through the application of a positive tension on the drive belt in addition to the motor weight tension.

Another object of the invention is the provision of means for safeguarding the motor and the motor mounting against injury upon breakage of the drive belt.

Other objects and advantages of the invention relate to various improved details of construction and arrangements of the parts as will be more fully set forth in the detailed description to follow.

Referring to the drawing:—

Fig. 1 is a side elevational view of the motor mounting showing the same as applied to an upright portion of a machine frame, and illustrating the position of the parts with reference to the main pulley or drive shaft of the machine, Fig. 2 is an end elevational view of the mounting showing the motor in position thereon, Fig. 3 is a top plan view of the motor mounting with the motor removed, showing in section a frame member or upright by which the mounting may be supported, Fig. 4 is a vertical sectional view, taken substantially along the line 4—4 of Figs. 1 and 3, Fig. 5 is a vertical sectional view through the motor support and its pivotal connection with the base, taken substantially along the line 5—5 of Fig. 3, and, Fig. 6 is a perspective view of one form of upright such as may be employed for supporting the motor mounting when the motor is to be employed in connection with a shaft to be driven which is not mounted in associated relation with an upright frame member adapted to support the motor mounting.

In the embodiment of the invention illustrated in Fig. 1 of the drawing there is shown a machine 1 of any desired character provided with a supporting frame member 2 adapted for attachment to the floor by bolts 3, and having a main drive shaft 4 carrying a pulley 5 by which power is transmitted to the machine from the motor 6 by means of a drive belt 7.

The motor mounting comprises a base 8, which in the present instance comprises a pair of frame members 9 arranged in substantial parallelism with each other and connected by a shaft 10, to which they may be secured, if desired. The frame members 9 are provided with oppositely positioned longitudinal slots 11 for a purpose which will be more fully described, and each has an offset lug 12 located upon that side of the shaft 10 opposite to the main body portion of the frame member.

A motor support 14 is pivotally mounted upon the shaft 10 and may comprise a pair of beams 15, each of which, as shown, is provided with a bearing 16 for mounting upon one end of the shaft 10 outwardly of the base 8. Each beam 15 may be provided upon its upper face with a longitudinal recess 17 adapted to receive the head portions of securing bolts 18 for attaching a motor base 20 to the beams. Each beam 15 may be provided also with an offset portion 21 for supporting an adjusting bolt 22 in position to permit the adjusting bolt to engage the motor base 20 for maintaining the motor base in desired position with relation to the support 14, or for adjusting its position thereon as may be required.

In that form of the invention shown in Figs. 1 to 5 of the drawing, a pair of suitably shaped supporting members 24 may be positioned upon opposite sides of the frame member 2 and secured thereto by bolts 25. Each supporting member 24 may be provided upon its outer face with lugs 26 forming a recess 27 adapted to receive one of the frame members 9, and each supporting member has a laterally offset lug 28 provided with an opening for receiving a threaded adjusting member 30, which member may be formed integral with one of the frame members 9 for adjustably securing the frame member in position relative to the supporting member 24. Each supporting member 24 may be provided also with a threaded opening for receiving a combined guide and clamping bolt 31 passed through the longitudinal slot 11 of one of the frame members 9 for permanently locking the frame members in adjusted position with reference to the supporting member and upright.

In that form of upright such as may be employed generally for supporting the motor mounting when it is desired to use the same for connecting a motor to a shaft to be driven in locations where a frame member such as is shown in Figs. 1, 3 and 4 is not available, a post or upright 34 may be provided, having a base 35 which is adapted to be secured to the floor, side wall, ceiling or the like, as by means of bolts 36. The post 34 may be provided with grooves or recesses 37 located upon opposite sides thereof for the reception of the frame members 9, the frame members being supported therein by bolts 38 passed through the slots 11 in the frame members and into threaded openings 39 formed in the post 34. Offset lugs 40 may be formed integral with the post 34 and each provided with an opening 41 for receiving one of the threaded members 30 carried by a frame member 9 for adjusting each frame member with relation to the post 34.

In each form and application of the invention as shown herein, the base 8 of the motor mounting may be adjustably secured to the supporting member 2 or post 34 to locate the motor support 14 at such distance from the shaft 4 to be driven as to obtain the desired tension upon the drive belt when the motor 6 is mounted in the desired adjusted position on the motor support 14, and the belt 7 passed over the pulley 5 and motor pulley 42 carried by the motor shaft 43. The adjustment of the base 8 of the motor mounting may be designated for convenience as the primary adjustment, and the adjustment of the motor on the motor support 14 as the secondary adjustment.

The primary adjustment may be employed to position initially the motor support 14 at the desired distance from the driven shaft 4, that is, to locate the shaft 10 at such distance from the motor shaft 4 that the motor may be so positioned on the support 14 as to render effective the desired proportion of the weight of the motor for tensioning the drive belt 7; or to vary the distance separating the shaft 10 and the driven shaft 4 in order to compensate for variations in the length of the drive belt; or it may be utilized to apply added tension upon the belt, if desired, when the parts are in such position that the motor support 14 is turned to the limit of its rotative movement about the shaft 10. The adjustment of the motor base 20 relative to the motor support 14 may be employed either for the purpose of properly locating the center of gravity of the motor 6 with relation to the shaft 10, or for the purpose of exerting increased tension directly upon the drive belt 7 as may be found advisable.

In general it is desirable to provide a substantially constant and uniform tension upon a driving belt which may not be materially reduced by the elongation of the belt while in use and which may be released readily to permit removal of the belt when desired. This is accomplished by first securing the base 8 of the motor mounting to the upright or frame member 2 in such adjusted position as to bring the shaft 10 at approximately the necessary distance from the shaft 4 for securing the desired balance of the motor 6 relative to the shaft 10. The motor 6 is then mounted on the support 14 to position the motor shaft 42 in the desired relation with the shaft 4 to be driven, and at the same time so position the motor 6 that the center of gravity of the motor is located at the desired distance from the axis of the shaft 10, or in other words, so that a suitable proportion of the weight of the motor may be applied to the driving belt 7 for imparting the desired degree of tension to the driving belt.

When the parts are assembled as above described, such changes of adjustment as are found to be necessary may be made by varying the positions of the frame members 9 with respect to the upright member or post by means of the adjusting bolt 30. In like manner, such changes of adjustment as may be desired to vary the tension applied to the belt 7 by the weight of the motor may be made by means of the adjusting bolts 22.

In the event of breakage of the driving belt 7, or its accidental slippage from one of the pulleys, the offset lugs 12 carried by the frame members 9 will engage the supporting beams 15 to prevent the motor and motor support from falling such a distance as might cause injury to the parts. When it is desired to remove the drive belt 7, the motor support 14 may be turned about the shaft 10 sufficiently to loosen the drive belt, and after the removal of the belt the motor support may then be lowered into engagement with the offset lugs 12 in which position the motor will be supported until it may be desired to again effect a connection with the shaft to be driven.

The frame members 9 may be either rotatably or non-rotatably mounted upon the shaft 10, or other means may or may not be provided for interconnecting the frame members 9 to each other so that they are or are not required to move as a unit. In either case, after the connection of the frame members, to the upright member or post they are held in fixed position relative to each other and combine to form a base for supporting the shaft 10 in adjusted relation to the shaft 4. In like manner, the beams 15 may or may not be permanently interconnected with each other by means other than their attachment to the base 20 of the motor, since when the motor is mounted thereon they co-act to provide a unitary support for the motor. In any case, either the frame members 9, or the beams 15, or both, are pivotally mounted upon the shaft 10 to permit pivotal movement of the support 14 relative to the base 8. If desired, either the frame members 9 or the beams 15 may each be provided with a set screw or other suitable means for engagement with the shaft 10, whereby the frame members 9 or beams 15 may be adjustably secured to the shaft 10 in a variety of different positions to permit adjustment of the motor in a direction longitudinally of the shaft 10 so that the position of the motor may be varied to bring the motor pulley 42 into alignment with the pulley 5 and insure proper tracking of the drive belt.

It will be understood that the present construction permits the mounting of the motor 6 on the support 14 in adjusted relation with the shaft 10, as well as its adjustment relative to the shaft 10 after being mounted on the support. By means of the improved mounting the motor may be so positioned upon the support 14 as to pivot about the shaft 10 to utilize any desired proportion of its weight for tensioning the drive belt 7, and is capable of adjustment relative to the upright 2 by the primary adjusting means, as well as being capable of adjustment relative to the axis of the shaft 10 to vary both the position of the shaft 10 relative to the shaft 4 and the degree of tension to be applied to the drive belt from the weight of the motor. Any desired combination of these adjustments may also be employed to increase or decrease the motor weight tension as applied to the drive belt.

What I claim is:—

1. In a motor mounting of the character described, a base portion comprising spaced side rails, opposed means slidably mounted upon the inner faces of said spaced side rails for adjustably clamping the base to an upright, and a motor support pivotally mounted upon the base.

2. In a motor mounting, two pairs of elongated members pivotally connected together at fixed points located adjacent to corresponding ends of each pair for articulated movement of each pair as a unit relative to the other pair about a common axis, clamping means carried by one pair of said elongated members and projecting inwardly therefrom in opposed relation with each other for adjusted attachment to opposite sides of a fixed support, and means carried by said clamping means for adjustably positioning the elongated members with reference to the fixed support.

3. In a motor mounting, a motor, a motor support, a shaft carried by said support, spaced elongated frame members arranged in substantial parallelism and each having one end pivotally connected with said shaft, and opposed clamping means carried by said frame members and each offset laterally from one of said frame members for attachment to a fixed support to locate the motor supporting shaft in any one of a plurality of adjusted positions towards or away from said fixed support.

4. In a motor mounting of the character described, a base portion comprising spaced side rails having opposed end bearings carried by adjacent ends thereof, opposed means slidably mounted upon said side rails and movable towards and from the end bearings for adjustably clamping the base to a stationary member, and a motor support pivotally mounted in said end bearings.

5. In a motor mounting, a base portion comprising spaced side rails having aligned end bearings, means carried by said side rails and mounted for sliding movement thereon towards or from said bearings for adjustably clamping the base portion to a stationary member, a motor support, and a shaft pivotally connecting said motor support with said end bearings.

6. In a motor mounting, a base portion comprising spaced side rails provided with opposed end bearings carried by one end of each side rail, means slidably mounted upon said side rails and located adjacent the opposite ends thereof from said end bearings for adjusted attachment to a stationary member, means for adjusting said side rails relative to said attaching means, and a motor support pivotally mounted in said end bearings.

7. A motor mounting comprising an upright, an elongated base portion, clamping means carried by said base portion and adjustable longitudinally thereof for adjusted attachment to the upright, means carried by said clamping means for adjustably securing said clamping means in any one of a plurality of positions longitudinally of the base portion, a motor support, means for pivotally connecting the motor support to that portion of the base most remote from the point of attachment to the upright, and means for adjustably mounting the motor on the motor support whereby double adjustment may be had between the upright and motor.

8. The combination with a pair of elongated supporting beams and a pair of elongated frame members, of means for pivotally connecting adjacent ends of said supporting beam with adjacent ends of said frame members whereby the major portions of said supporting beams are located upon one side of said connecting means and are movable as a unit relative to said frame members about said connecting means, opposed clamping means carried by said frame members for adjusted connection with opposite sides of a fixed support and located wholly upon one side of said pivotal connecting means, and means carried by the supporting beams, for adjusted connection with a motor.

HORMISDAS MASSÉ.